United States Patent [19]

Terada et al.

[11] Patent Number: 5,743,145
[45] Date of Patent: Apr. 28, 1998

[54] GEAR MECHANISM FOR ADJUSTING BACKLASH BETWEEN BEVEL GEARS

[75] Inventors: Akihiro Terada, Fujiyoshida; Kenichiro Abe, Yamanashi, both of Japan

[73] Assignee: Fanuc Ltd., Yamanashi, Japan

[21] Appl. No.: 580,429

[22] Filed: Dec. 27, 1995

[30] Foreign Application Priority Data

Dec. 28, 1994 [JP] Japan ................. 6-327749

[51] Int. Cl.$^6$ ................................. F16H 55/20
[52] U.S. Cl. ................. 74/409; 74/440; 74/420; 74/417
[58] Field of Search ................. 74/400, 409, 440, 74/420, 421 R, 416, 417

[56] References Cited

U.S. PATENT DOCUMENTS

| | | | |
|---|---|---|---|
| 686,436 | 11/1901 | Baxter | 74/400 |
| 1,143,720 | 6/1915 | Masury | 74/400 |
| 1,551,017 | 8/1925 | Erway | 74/400 |
| 2,004,374 | 6/1935 | Marles | 74/400 |
| 2,360,497 | 10/1944 | Holmes et al. | 74/400 |
| 2,386,946 | 10/1945 | Greiner | 74/400 |
| 2,788,674 | 12/1957 | Dennys | 74/400 |
| 3,826,151 | 7/1974 | F'Geppert | 74/400 |

*Primary Examiner*—Charles A. Marmor
*Assistant Examiner*—David M. Fenstermacher
*Attorney, Agent, or Firm*—Nikaido Marmelstein Murray & Oram LLP

[57] ABSTRACT

A gear mechanism in which the backlash between bevel gears can be easily adjusted is provided. The gear mechanism has first and second bevel gears which engage with each other; a supporting member, including first and second threaded portions, for the first and second bevel gears, and first and second bearings for rotatably supporting the first and second bevel gears on the supporting member. The first and second bearing include cylindrical members with threaded portions for engagement with the first and second threaded portions of the supporting member.

4 Claims, 3 Drawing Sheets

GEAR MECHANISM FOR ADJUSTING BACKLASH BETWEEN BEVEL GEARS

BACKGROUND OF THE INVENTION

1. Field of the Invention

The invention relates to a gear mechanism which is improved to facilitate the adjustment of backlash.

2. Description of the Related Art

Backlash between bevel gears is adjusted by moving the bevel gears along the respective axes thereof. In particular, in order to adjust the backlash, the bevel gears engaging with each other are moved along the respective axes thereof, then they are secured at the respective axial positions by using spacers and bolts.

However, in the backlash adjustment mechanism of the prior art, the bolts must be fastened and loosened every time the spacers are added and removed to adjust the axial positions of the bevel gears which increases the time and work for adjustment. Further, the backlash is adjusted to a discreet minimum adjusting length, that is, the thickness of the spacer, which limits the fine adjustment of the backlash.

The invention is directed to solve the problems in the prior art.

SUMMARY OF THE INVENTION

According to an aspect of the invention, there is provided a gear mechanism in which the backlash between bevel gears can be adjusted easily. The gear mechanism comprises first and second bevel gears which engage with each other; a supporting member, including first and second threaded portions, for the first and second bevel gears, and first and second bearing means for rotatably supporting the first and second bevel gears on the supporting member. The first and second bearing means include cylindrical members with threaded portions for engagement with the first and second threaded portions of the supporting member.

The rotation of the cylindrical members of the first and second bearing members with the respective threaded portions thereof engaging the first and second threaded portions of the supporting member allows the first and second bevel gear to move for adjusting the backlash therebetween.

According to another aspect of the invention, there is provided a gear mechanism in which the backlash between bevel gears can be adjusted easily. The gear mechanism comprises a first bevel gear connected to a driving source, the first bevel gear being rotatable about a first axis; a second bevel gear engaging the first bevel gear, the second bevel gear being rotatable about a second axis; an intermediate gear connected to the second bevel gear for rotation with the second gear; an output gear engaging the intermediate gear, the output gear being rotatable about an axis parallel to the second axis. A supporting member for the first and second bevel gears and the output gear is provided. The supporting member includes a first threaded portion. A frame, for mounting the second bevel gear and the intermediate gear to the supporting member, is mounted to the supporting member so as to move along the first axis, and means for securing the frame relative to the supporting member at an axial position along the first axis is provided. Further, first bearing means for rotatably supporting the first bevel gear on the supporting member and second bearing means for rotatably supporting the second bevel gears on the frame are provided. The first bearing means includes a cylindrical member with a threaded portions for engagement with the first threaded portion of the supporting member. The second bearing means includes a cylindrical member with a threaded portion for engagement with the second threaded portion of the frame.

The axial movement of the frame adjusts the backlash between the intermediate and the output gears. After the adjustment of the backlash between the intermediate and the output gears, the cylindrical members of the first and second bearing means are rotated with the threaded portion of the first bearing means engaging the first threaded portion of the supporting member, and the threaded portion of the second bearing means engaging the second threaded portion of the frame. The rotation of the cylindrical members allows the first and second bevel gear to move for adjusting the backlash therebetween.

In the preferred embodiment of the invention, the gear mechanism further comprises means for preventing the rotation of the cylindrical members of the first and second bearing means and to lock the axial positions of the respective cylindrical members.

Further, the first and second axes may perpendicularly intersect to each other, and the threaded portions are provided on the outer surfaces of the cylindrical members of the first and second bearing means about the first and second axes respectively.

BRIEF DESCRIPTION OF THE DRAWINGS

These and other objects and advantages and further description will now be discussed in connection with the drawings in which.

DESCRIPTION OF THE PREFERRED EMBODIMENTS

Figure 3:
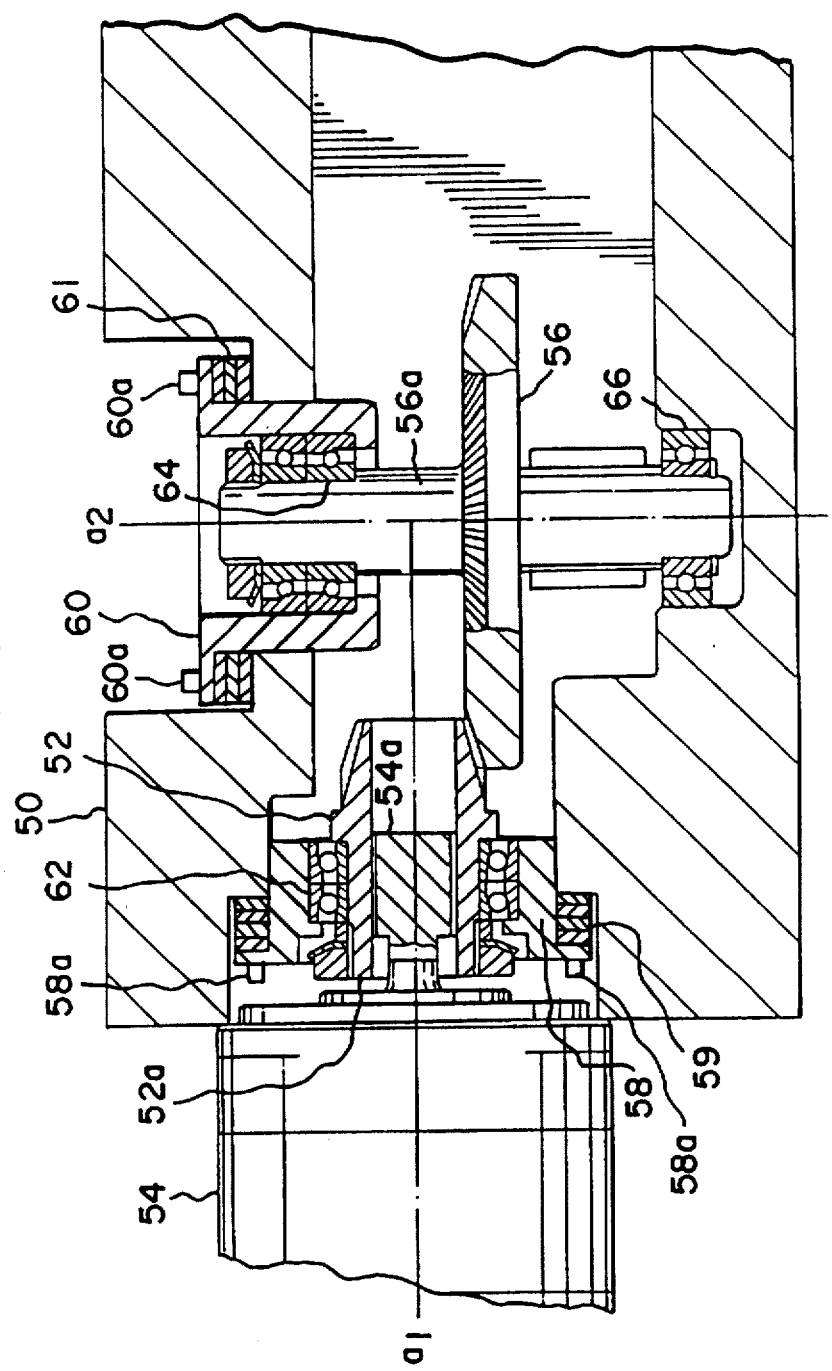
FIG. 3 is a section of a gear mechanism of the prior art.

In FIG. 3, a bevel gear mechanism in the backlash can be adjusted is illustrated as an example of the prior art. The gear mechanism of FIG. 3 comprises a first bevel gear 52 and a second bevel gear 56 which engages the first bevel gear 52. The first and second bevel gears 52 and 56 are supported by a supporting member 50 so that the axes thereof intersect perpendicularly to each other.

The first bevel gear 52 is integrally formed with a shaft portion 52a which is supported by ball bearings 62 for rotation about an axis a1. The ball bearings 62 are mounted to the supporting member 50 through a first bearing mounting member 58. The first bearing mounting member 58 is slidable along the axis a1 relative to the supporting member 50. The shaft portion 52a is connected to a motor 54 as a driving source through a connecting means such as a splined shaft.

The second bevel gear 56 is integrally formed with a shaft 56a which is supported by ball bearings 64, 66 for rotation about an axis a2 at the opposite ends thereof. The axis a2 perpendicularly intersects the axis a1 of the first bevel gear 52. The ball bearings 64 are are mounted on the supporting member 50 through a second bearing mounting member 60. The second bearing mounting member 60 is slidable along the axis a2 relative to the supporting member 50.

Spacers 59 are provided between the first bearing mounting member 58 and the supporting member 50 so to adjust the axial position of the first bevel gear 52 along the axis a1. The first bearing mounting member 58 and the spacers 59 are secured to the supporting member by bolts 58a. Spacers 61 are provided between the second bearing mounting member 60 and the supporting member 50 to adjust the axial position of the second bevel gear 56 along the axis a2. The second bearing mounting member 60 and the spacers 61 are secured to the supporting member by bolts 60a.

In the prior art bevel gear mechanism, thus constituted, the backlash between the first and the second bevel gears 52 and 56 must be adjusted by repeating mounting and removing the spacers 59 and 61 with the amount of the backlash measured. This makes the adjustment of the backlash complicated since the tightening and loosening of the bolts 58a and 60a are required as are mounting and removing of the spacers 59 and 61. Further, the backlash is adjusted by a discreet minimum adjusting length, that is the thickness of the spacer, which limits the fine adjustment of the backlash.

Figure 1:
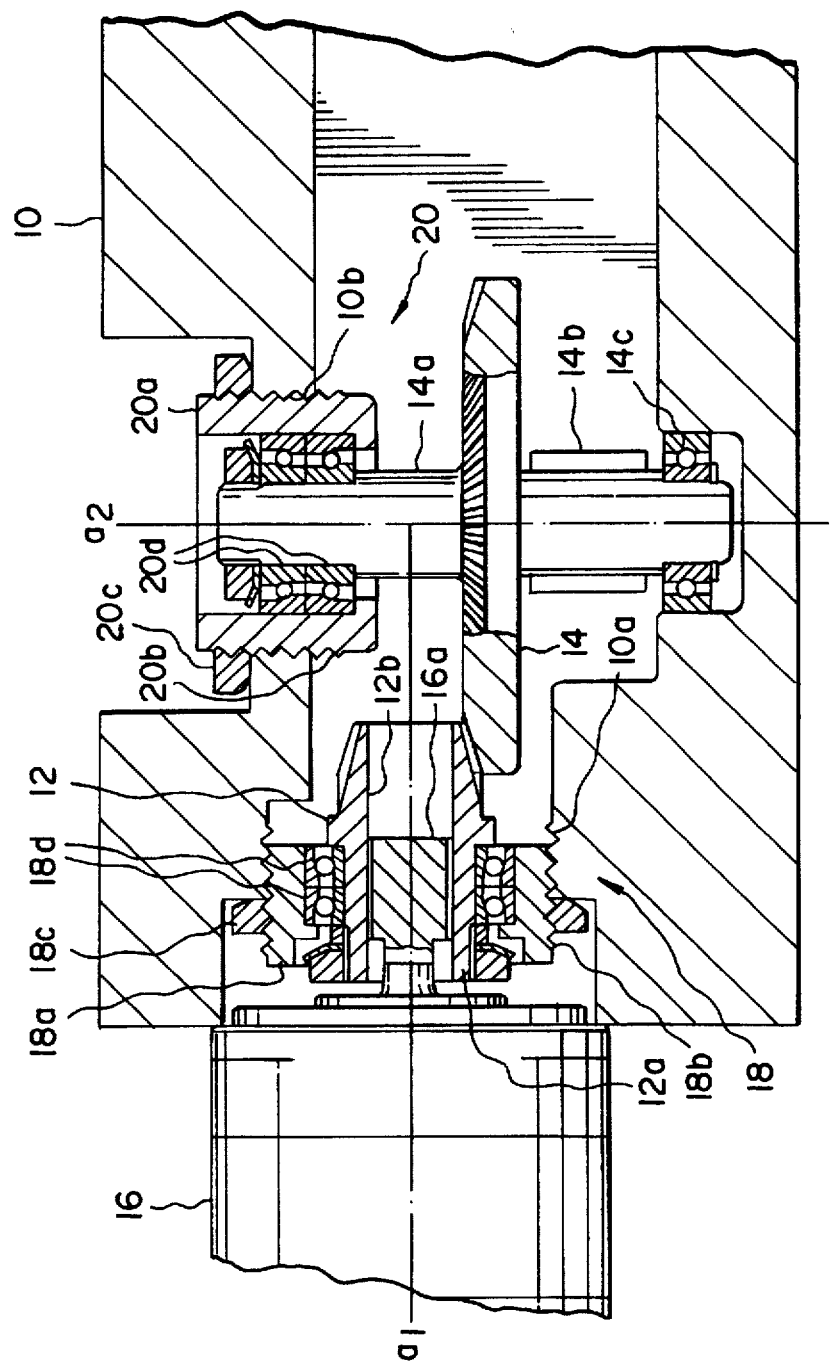
FIG. 1 is a section of a gear mechanism according to the first embodiment of the invention.

With reference to FIG. 1, the first embodiment of the invention will be described.

The first embodiment of the invention comprises a first bevel gear 12 and a second bevel gear 14 which engages with the first bevel gear 12. The first gear 12 is mounted to a supporting member 10 through a first bearing means 18 for rotation about an axis a1. The first bevel gear 12 includes a shaft portion 12a and a through hole 12b which has a circular section. A spline portion is provided on the inner surface of the through hole 12b. A shaft 16a of a motor 16, which is mounted to the supporting member 10, is inserted into the through hole 12b. The shaft 16a includes a spline portion which mates with the spline portion of the through hole 12b. Thus, the first bevel gear 12 is connected to the shaft 16a of the motor 16 through the spline connection so that the first bevel gear 12 can move in the axial direction but cannot move in the rotational direction relative to the shaft 16a of the motor 16.

The first bearing means 18 includes two ball bearings 18d, preferably angular ball bearings, and a first bearing mounting member 18a for the ball bearings 18d. The first bearing mounting member 18a is substantially formed into a cylinder with a threaded portion 18b on the outer surface thereof. The supporting member 10 includes a first threaded portion 10a for engagement with the threaded portion 18b of the first bearing mounting member 18a. The outer races of the ball bearings 18d are fitted onto the inner surface of the first bearing mounting member 18a, and the inner races of the ball bearings 18d are fitted onto the outer surface of the shaft portion 12a of the first bevel gear 12. The first bevel gear 12 is mounted to the supporting member 10 for rotation about the axis a1 by engaging the threaded portion 18b of the first bearing mounting member 18a with the first threaded portion 10a of the supporting member 10. Further, a locking nut 18c is provided on the threaded portion 18b of the first bearing mounting member 18a to fasten the first bearing mounting member 18a at an axial position along the axis a1.

The second bevel gear 14 is integrally formed with the shaft 14a. A spur gear 14b is integrally formed on the shaft 14a for engagement with an output gear (not shown). The second bevel gear 14 is mounted to the supporting member 10 for rotation about the axis a2 by a second bearing means 20 and a ball bearing 14c.

The second bearing means 20 includes two ball bearing 20d, preferably angular ball bearings, and a second bearing mounting member 20a for the ball bearings 20d. The second bearing mounting member 20a is substantially formed into a cylinder with a threaded portion 20b on the outer surface thereof. The outer races of the ball bearings 20d are fitted onto the inner surface of the second bearing mounting member 20a, and the inner races of the ball bearings 20d are fitted onto the outer surface of the shaft 14a of the second bevel gear 14. The supporting member 10 includes a second threaded portion 10b for engagement with the threaded portion 20b of the second bearing mounting member 20a. The second bevel gear 14 is mounted to the supporting member 10 for rotation about the axis a2 by engaging the threaded portion 20b of the second bearing mounting member 20a with the second threaded portion 10b of the supporting member 10. Further, a locking nut 20c is provided on the threaded portion 20b of the second bearing mounting member 20a to fasten the second bearing mounting member 20a at an axial position along the axis a2.

The functional operation of the first embodiment will be described.

The locking nuts 18c and 20c for the first and second bearing mounting members 18a and 20a are loosened to rotate the the first and second mounting members 18a and 20a relative to the supporting member 10. The first and second bearing members are moved along the axes a1 and a2 respectively by the rotation thereof.

Thus, the fist and second bevel gears 12 and 14 move along the axes a1 and a2 with the first and second bearing mounting members 18a and 20a respectively. In the embodiment shown in FIG. 1, the adjustment of the backlash is carried out by moving the first and second bevel gears with a measuring apparatus such as a pickup, which is provided on the second bevel gear 14, measuring the amount of backlash to optimize the backlash. Once the optimum backlash is obtained, the locking nuts 18c and 20c are fastened to prevent the first and second bearing mounting members 18a and 20a from moving.

Figure 2:
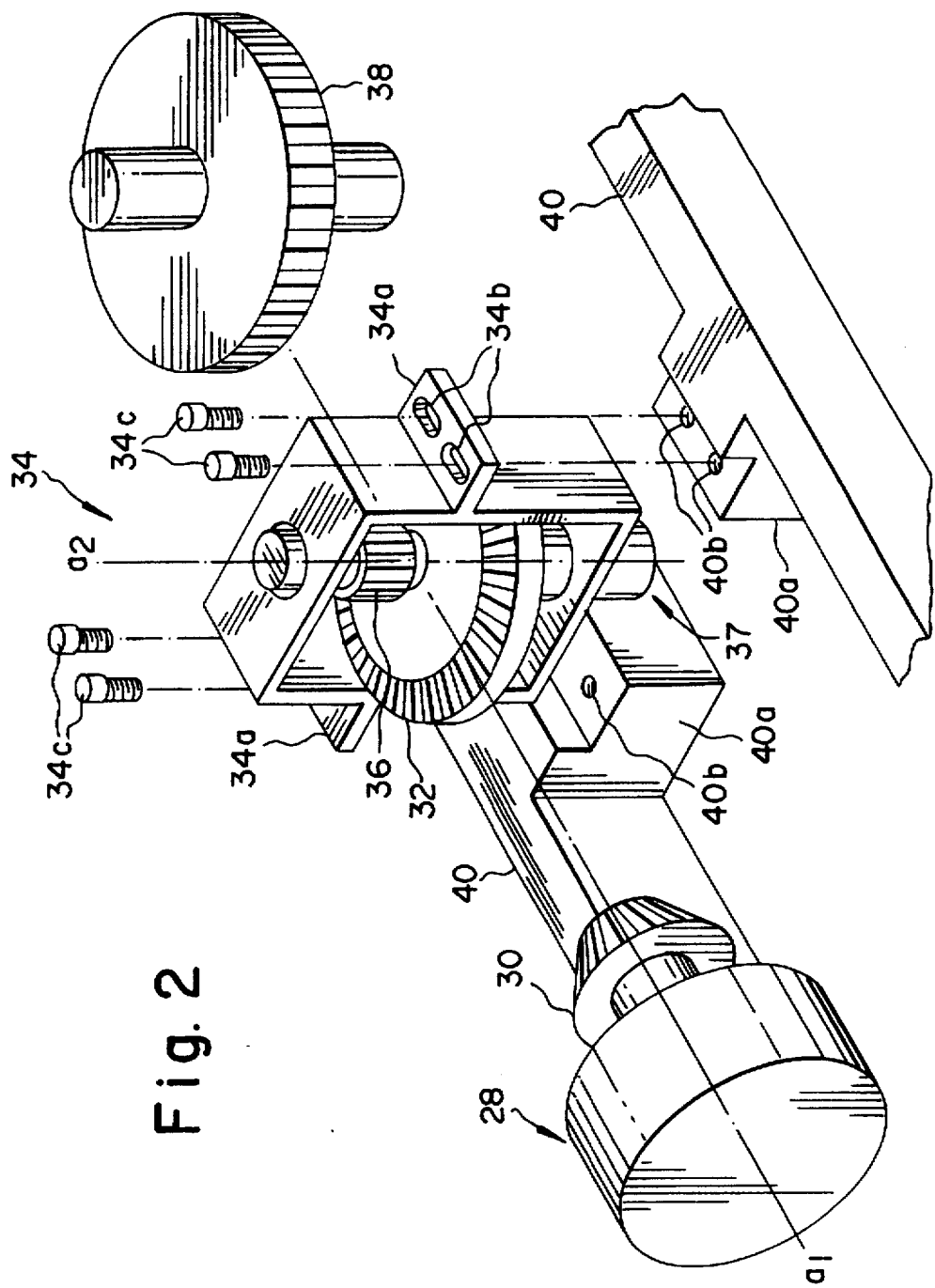
FIG. 2 is an exploded perspective view of a gear mechanism according to the second embodiment of the invention.

With reference to FIG. 2, the second embodiment of the invention will be described.

In FIG. 2, a first bevel gear 30 as an input gear, which is connected to a driving source such as an electrical motor (not shown), is mounted to a supporting member 40 by a first bearing means 28, which is substantially identical to the first bearing means 18 of the first embodiment, so that the first bevel gear 30 can move along an axis a1. It can be understood that the supporting member 40 includes a first threaded portion (not shown) for engagement with the threaded portion (not shown) of the first bearing means 28 as in the first embodiment. Further, as in the first embodiment, the first bevel gear 30 is connected to the shaft of the motor so that the first bevel gear 30 can move in the axial direction but cannot move in the rotational direction.

A second bevel gear 32 as an intermediate gear is mounted to a frame 34 by a second bearing means 37, which is substantially identical to the second bearing means 20 of the first embodiment, so that the second bevel gear 32 can move along an axis a2. The second bearing means includes a cylindrical member and a threaded portion on the outer surface of the cylindrical member as in the first embodiment. The frame includes a second threaded portion (not shown) for engagement with the threaded portion of the second bearing means 37. The rotation of the cylindrical member of the second bearing means 37, with the threaded portion of the second bearing means 37 engaging the second threaded portion of the frame 34, moves the second bevel gear along the second axis a2. The second bevel gear 32 is integrally formed with a shaft which is rotationally supported by the frame 34 by the second bearing means 37 and a ball bearing (not shown) at the lower and upper ends of the shaft in FIG. 2. Further, an intermediate spur gear 36 is connected to the shaft for rotation with the second bevel gear. The spur gear engages an output gear 38 as described below.

The frame 34 is mounted to supporting members 40 so that the frame 34 can move along the axis a1 relative to the supporting members 40 as described below. The frame 34 includes a pair of mounting portions 34a on the opposite sides about the axis a1 to extend outwardly from the respective side surfaces. Each of the mounting portions 34a includes two slots 34b which are elongated in the direction parallel to the axis a1. The supporting members 40 include brackets 40a on the respective inner surface and two threaded holes 40b on each bracket as shown in FIG. 2. Bolts 34c are inserted through the slots 34b for engagement with threaded holes 40b, which are provided on a supporting ember 40, to secure the frame 34 to the supporting member 40.

In FIG. 2, a spur gear 38 is provided as the output gear for engagement with the spur gear 36 on the shaft of the second bevel gear 32. The output shaft 38 is supported on the supporting members 40 by bearings (not shown) for rotation about an axis parallel to the axis a2 of the second spur gear 32.

The functional operation of the second embodiment will be described.

The bolts 34c are are loosened to allow the movement of the frame 34 with the bolts 34c and the slots 34b guiding the frame 34 along the axis a1. In this embodiment shown in FIG. 2, first, the adjustment of backlash between the intermediate spur gear 35 and the output spur gear 38 is carried out by axially moving the intermediate gear 36, which is supported on the frame 34, with a measuring apparatus such as a pickup, which may be provided on the pitch circle of the output gear 14, measuring the amount of backlash to optimize it. Once the optimum backlash is obtained, the bolts 34c are fastened to prevent the intermediate spur gear from moving along the axis a1.

Then, the first and second bevel gears 30 and 32 are moved along the axes a1 and a2 respectively as in the first embodiment to adjust the backlash therebetween. Thus, the overall backlash from the input first bevel gear to the output spur gear 38.

In the first and second embodiments described above, the first and second bevel gears are rotatable about the axes a1 and a2 which intersect and are perpendicular to each other. However, the axes a1 and a2 may intersect by an angle other than 90 degrees. Further, the first and second bevel gears may be spiral bevel gears instead of straight bevel gears.

It will be further understood by those skilled in the art that the forgoing description is a preferred embodiment of the disclosed device and that various changes and modifications may be made without departing from the spirit and scope of the invention.

We claim:

1. A gear mechanism comprising:

a first bevel gear connected to a driving source, the first bevel gear being rotatable about a first axis;

a second bevel gear engaging the first bevel gear, the second bevel gear being rotatable about a second axis;

an intermediate gear connected to the second bevel gear for rotation with the second gear;

an output gear engaging the intermediate gear, the output gear being rotatable about an axis parallel to the second axis;

a supporting member for the first and second bevel gears and the output gear, the supporting member including a first threaded portion; and a frame for mounting the second bevel gear and the intermediate gear to the supporting member, the frame including a second threaded portion, and being mounted to the supporting member so as to move along the first axis;

means for securing the frame relative to the supporting member at an axial position along the first axis;

first bearing means for rotatably supporting the first bevel gear on the supporting member;

second bearing means for rotatably supporting the second bevel gears on the frame; and the first bearing means including a cylindrical member with a threaded portion for engagement with the first threaded portion of the supporting members and the second bearing means including a cylindrical member with a threaded portion for engagement with the second threaded portion of the frame.

2. A gear mechanism according to claim 1, further comprising means for preventing the rotation of the cylindrical members of the first and second bearing means to lock the axial positions of the respective cylindrical members.

3. A gear mechanism according to claim 2, in which the first and second axes perpendicularly intersect each other.

4. A gear mechanism according to claim 3, in which the threaded portions; are provided on the outer surfaces of the cylindrical members of the first and second bearing means about the first and second axes respectively.

* * * * *